US008477377B2

(12) United States Patent
Stanich et al.

(10) Patent No.: US 8,477,377 B2
(45) Date of Patent: Jul. 2, 2013

(54) MECHANISM FOR INTEGRATION OF PRINT QUALITY ENHANCEMENT (PQE) AND MULTI-BIT HALFTONE DATA (75) Inventors: Mikel Stanich, Longmont, CO (US); John Charles Wilson, Longmont, CO (US); Larry M. Ernst, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 874 days.

(21) Appl. No.: 12/633,925

(22) Filed: Dec. 9, 2009

(65) Prior Publication Data

US 2011/0134486 A1 Jun. 9, 2011

(51) Int. Cl.
H04N 1/405 (2006.01)
H04N 1/409 (2006.01)

(52) U.S. Cl.
USPC .......... 358/2.1; 358/3.06; 358/3.23; 358/3.27

(58) Field of Classification Search
USPC .............. 358/1.9, 2.1, 2.99, 3.06, 3.21, 3.23, 358/3.24, 3.26, 3.27, 521, 530, 532, 534–536, 358/447, 448, 461, 462, 463, 464
See application file for complete search history.

(56) References Cited

U.S. PATENT DOCUMENTS

| 5,392,365 | A | * | 2/1995 | Steinkirchner | 358/462 |
|---|---|---|---|---|---|
| 5,742,703 | A | * | 4/1998 | Lin et al. | 358/462 |
| 5,832,141 | A | * | 11/1998 | Ishida et al. | 358/462 |
| 6,775,031 | B1 | * | 8/2004 | Fujiwara | 358/2.1 |
| 6,923,521 | B2 | | 8/2005 | Bates et al. | |
| 6,961,150 | B2 | * | 11/2005 | Okuyama | 358/2.1 |
| 6,975,427 | B1 | * | 12/2005 | Lucky et al. | 358/1.9 |
| 6,999,203 | B1 | | 2/2006 | Kim | |
| 7,064,859 | B1 | * | 6/2006 | Dittrich et al. | 358/1.9 |
| 7,064,862 | B2 | * | 6/2006 | Takashimizu | 358/1.9 |
| 7,251,046 | B2 | | 7/2007 | Mochizuki et al. | |
| 7,327,380 | B2 | | 2/2008 | Sanger et al. | |
| 7,408,679 | B2 | * | 8/2008 | Ernst et al. | 358/3.02 |
| 7,746,505 | B2 | * | 6/2010 | Lim | 358/3.27 |
| 2003/0043412 | A1 | | 3/2003 | Roylance | |

(Continued)

OTHER PUBLICATIONS

Ernst, L. et al., "An interpolation Approach in Print Quality Enhancement Feature Determination", Beijing Int'l Conference on Imaging, May 2005, Abstract.
Fischer, M. et al., "Laser Print Quality: Practically Continuous Addressability", Proceedings of the Int'l Society for Optical Engineering, Jan. 2008, Abstract.

Primary Examiner — Scott A Rogers
(74) Attorney, Agent, or Firm — Blakely, Sokoloff, Taylor & Zafman LLP (57) ABSTRACT A mechanism for integrating print quality enhancement (PQE) and multi-bit halftone data is disclosed. A system of embodiments of the invention includes a print control unit communicably coupled to a printer, the print control unit operable to process received multi-bit input print data for printing by the printer. The system further comprises a PQE card communicably coupled with the printer, the PQE card configured to separate multi-bit text and line art input data from multi-bit halftone image input data in the multi-bit input print data, ignore any of the identified multi-bit halftone image input data for purposes of applying PQE technology to the identified multi-bit halftone image input data, and apply the PQE technology to the identified multi-bit text and line art input data. Lastly, the system includes a print head communicably coupled to the printer, the print head operable to print multi-bit output created by the PQE card.

20 Claims, 6 Drawing Sheets

U.S. PATENT DOCUMENTS

2006/0170758 A1 8/2006 Ernst et al.
2007/0216777 A1 9/2007 Quan et al.
2008/0187235 A1 8/2008 Wakazono et al.
2011/0255117 A1* 10/2011 Umeda .................. 358/1.13

* cited by examiner

MECHANISM FOR INTEGRATION OF PRINT QUALITY ENHANCEMENT (PQE) AND MULTI-BIT HALFTONE DATA

FIELD OF THE INVENTION

This invention relates generally to the field of printing systems. More particularly, the invention relates to integrating print quality enhancement (PQE) and multi-bit halftone data.

BACKGROUND

In the printing industry, many image enhancement techniques have been introduced in printing systems to improve the quality of printed documents. For example, print quality enhancement (PQE) is a technology that permits one to obtain high-quality printing while using printers with lower resolution than would be required otherwise. The benefits of PQE include reduced edge raggedness, control over boldness, stroke-imbalance correction, and improvements to the appearance of patterns that are difficult to print. Data bandwidth and storage requirements are therefore reduced. Over time, as printer dots per inch (DPI) resolutions have increased and the requirements for high-quality halftone image quality have increased, the need for edge-raggedness improvements have decreased. The emphasis therefore has shifted to using PQE boldness control to adjust halftone dot gain, instead of text boldness.

PQE relies on an imaging system with multiple exposure levels. The same multiple exposure level capabilities required for PQE can be exploited in the latest generations of higher-quality, higher-DPI print engines to produce higher-quality halftone images. These print engines are electro-photographic printers with capabilities as high as 1200 dots per inch (dpi) and 2-bits per spot, for example. The multi-bit capability is an improvement over binary data printers of the past. With binary data, pixels are either white or black. In comparison, the multi-bit capability allows the printer to expose the photoconductor with different intensity levels of light to create exposure that are not just black and white, but something falling in between black and white. For example, a 2-bit per spot printing system corresponds to 4 levels of exposure: a minimum level of exposure of white, a low-level exposure (between white and black), a medium-level exposure (between white and black), and a high-level exposure of black. These multiple levels of exposure can be employed by multi-bit halftones to increase the number of levels of gray that can be achieved for the same halftone design when compared to a binary halftone.

However, integrating PQE with the multi-bit halftone data of these high quality print engines has proven problematic. The problem lies in making systems that traditionally have PQE, which converts binary data to multi-bit data, work with a system that combines binary data and multi-bit halftone data, in such a way that the binary data can exist in a document as a white and full-intensity exposure level with PQE improvements, while co-existing with multi-bit data that is white or black, as well as the intermediate levels of gray. Current systems do not allow such combined data to exist while allowing PQE to be applied to the binary data and not the multi-bit halftone data.

As such, a system that is capable of integrating binary data for PQE purposes with multi-bit halftone data would be beneficial.

SUMMARY

In one embodiment, a mechanism for integrating print quality enhancement (PQE) and multi-bit halftone data is disclosed. A system of embodiments of the invention includes a print control unit communicably coupled to a printer, the print control unit operable to process received multi-bit input print data for printing by the printer. The system further comprises a PQE card communicably coupled with the printer, the PQE card configured to separate multi-bit text and line art input data from multi-bit halftone image input data in the multi-bit input print data, ignore any of the identified multi-bit halftone image input data for purposes of applying PQE technology to the identified multi-bit halftone image input data, and apply the PQE technology to the identified multi-bit text and line art input data. Lastly, the system includes a print head communicably coupled to the printer, the print head operable to print multi-bit output created by the PQE card.

In another embodiment, a method for integrating PQE and multi-bit halftone data is disclosed. The method includes receiving multi-bit input print data for printing by a control unit of a printer, separating, by a PQE card of the printer, multi-bit text and line art input data from multi-bit halftone input data, ignoring, by the PQE card, any identified multi-bit halftone input data for purposes of applying PQE technology to the identified multi-bit input data, applying, by the PQE card, the PQE technology to identified multi-bit text and line art input data, and printing, by a print head of the printer, multi-bit output data created by the PQE card, the multi-bit output data including the multi-bit text and line art data that has been modified by the PQE technology.

BRIEF DESCRIPTION OF THE DRAWINGS

A better understanding of the present invention can be obtained from the following detailed description in conjunction with the following drawings, in which.

DETAILED DESCRIPTION

A mechanism for integrating print quality enhancement (PQE) and multi-bit halftone data as disclosed is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
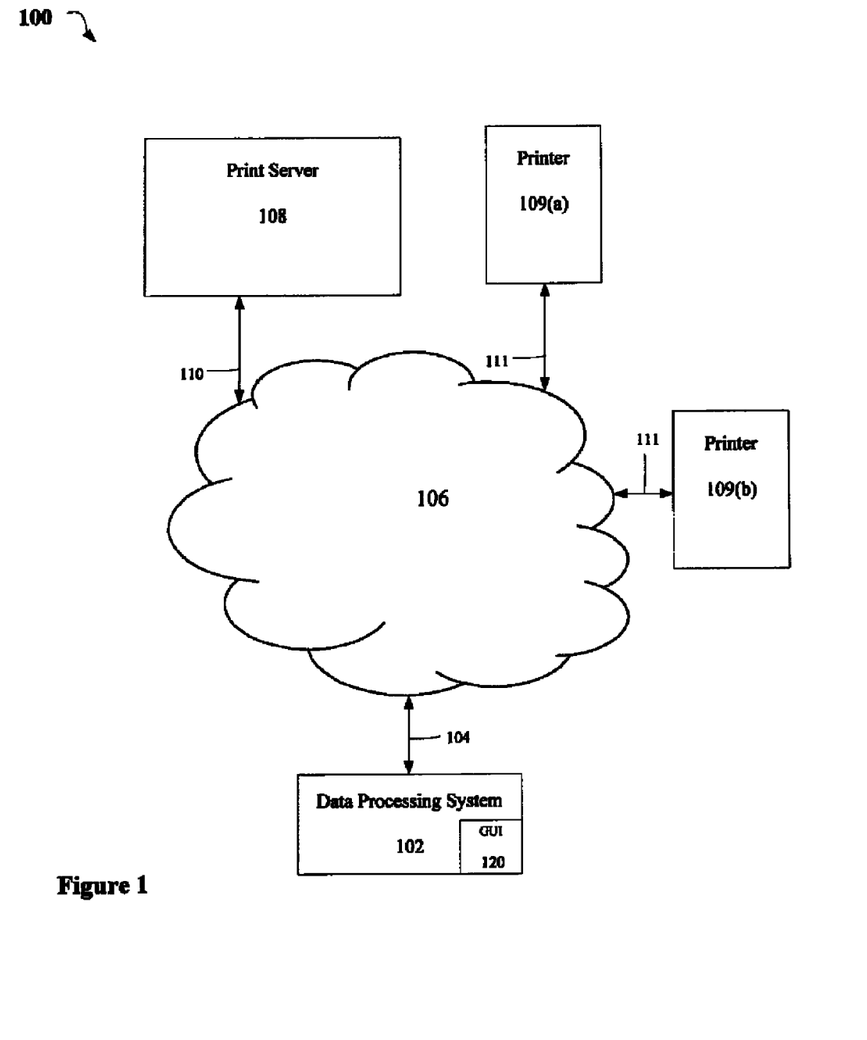
FIG. 1 illustrates one embodiment of a data processing system network.

Embodiments of the invention disclose a mechanism for integrating PQE and multi-bit halftone data. FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select the desired print server 108 and submit requests for service requests to printer 109 via print server 108 over network 106. In a further embodiment, print server 108 includes a print queue for print jobs requested by remote data processing systems.

Although described as separate entities, other embodiments may include print server 108 being incorporated in one or more of the printers 109. However in other embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 between data processing system 102 and one or more of printers 109. In other embodiments, the printing software manages printing of documents from multiple data processing systems 102 to the one or more printers 109.

According to one embodiment, the printing software product may be implemented using either InfoPrint Manager (IPM) or Infoprint ProcessDirector (IPPD), although other types of printing software may be used instead. In a further embodiment, data processing system 102 includes a print application that interacts with the printing software at printer server 108 to provide for efficient transmission of print jobs.

Figure 2:
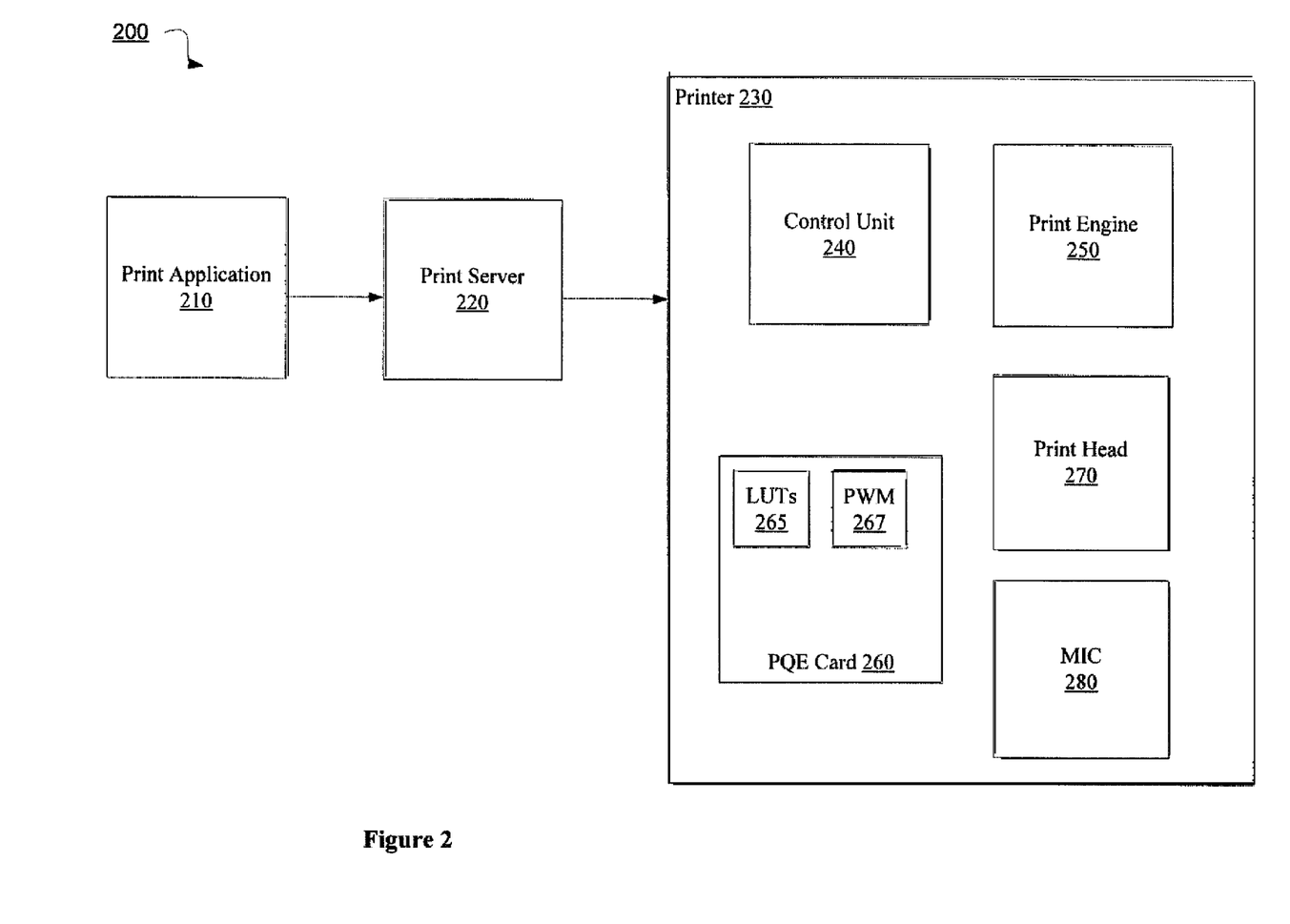
FIG. 2 illustrates a block diagram of a block diagram of a printing system implementing integrating print quality enhancement (PQE) and multi-bit halftone data according to an embodiment of the invention.

FIG. 2 illustrates a block diagram of a printing system 200 implementing integrating PQE and multi-bit halftone data according to an embodiment of the invention. In one embodiment, printing system may be implemented in network 100 described with respect to FIG. 1. Printing system 200 includes a print application 210, a server 220 and printer 230.

Printer 230 includes a control unit 240, a print engine 250, a PQE card 260, a print head 270, and Machine Interface Card 280. Print application 210 makes a request for the printing of a document. In one embodiment, print application 210 provides a Mixed Object Document Content Architecture (MO:DCA) data stream to print server 220. In other embodiments print application 210 may also provide PostScript (P/S) and PDF files for printing.

Print server 220 processes pages of output that mix all of the elements typically found in presentation documents, e.g., text in typographic fonts, electronic forms, graphics, image, lines, boxes, and barcodes. The AFP MO:DCA data stream is composed of architected, structured fields that describe each of these elements.

In one embodiment, print server 220 communicates with control unit 240 of printer 230 via an Intelligent Printer Data Stream (IPDS). The IPDS data stream is similar to the AFP data stream, but is built to the destination printer's specific capabilities and command set, and to facilitate the interactive dialog between the print server 220 and the printer 230. The IPDS data stream may be built dynamically at presentation time, e.g., on-the-fly in real time. Thus, the IPDS data stream is provided according to a device-dependent bi-directional command/data stream.

According to one embodiment, control unit 240 processes and renders objects received from print server 220 and provides sheet maps for printing to print engine 250. The sheet map in the control unit is parsed by a Machine Interface Card (MIC) 280 into bands of image data that are processed by the PQE card 260 before being sent to the print head 270. In one embodiment, data to be processed by the control unit includes multi-bit text data combined with multi-bit halftone data. In other embodiments print server 220 may also raster image process (RIP) PostScript (P/S) and PDF files into combined multi-bit text and halftone image data. In yet other embodiments, the control unit 240 may include the PS/PDF RIP (raster image processor).

Printer 230 is able to process multi-bit combined data in order to get higher-quality halftone images by preserving the multi-bit halftone data intact (as-is) and processing the multi-bit text and line art data with PQE, while employing pulse width modulation (PWM) to implement variable exposure printing by the print head 270.

In embodiments of the invention, the PQE card 260 receives data from MIC card 280 to be processed and separates any multi-bit data associated with text or line art from multi-bit halftone data in the combined multi-bit input data. In one embodiment, the PQE card employs a windowing technique to classify data as text/line art data or multi-bit halftone data. Text/line art data is typically high-contrast data that is either minimum (e.g., white) or maximum (e.g. black) exposure level for the associated pixel (PELs). In addition, text/line art data is usually isolated in its proximity to image data. An exception to this is when text or line art occurs within a constant tint, which prior to screening is a region of constant contone data. With contone data, the tint will become a half-toned region after the RIP converts the contone data to multi-bit halftone data. The text, which will exist as maximum level contone data, will be combined with the half-toned region.

In embodiments of the invention, any identified multi-bit text data is processed with PQE treatment by the PQE card 260, while any identified multi-bit halftone data is not PQE'd (passed-through) by the PQE card 260. In one embodiment, the PQE card 260 uses a 5×5 neighborhood mask and a compare function on identified multi-bit text/line art data for PQE treatment. Multi-bit text/line art data from the masked region is converted to binary data using a threshold operation prior to the compare function.

The masked data is then compared to a collection of templates for a match to identify a type or pattern of the binary data. For example, the templates cover different patterns that the binary data may comprise, such as an edge, an isolated single pixel, a diagonal line, and so on. The template data includes the binary data, as well as "don't care" data, which does not have to match the binary data.

In embodiments of the invention, each template is associated with a feature value, and the center "current PEL" in the binary data takes on the feature value from its determined matching template. PWM exposure values are stored in LUTs 265 of the PQE card 260 for each possible feature value. Hence, a feature value is produced every time all of the masks are compared to the current binary data. The feature value corresponds only to the center PEL of the 5×5 mask region. For every PEL, a feature is produced that is used as an index to the LUTs 265, which, in turn, fetches the corresponding PWM exposure value.

Additional selection mechanisms are used to select the correct LUT from multiple look-up tables (LUTs) 265. The LUT switching can be used to select between LUTs that store PWM values used for PQE, and those used for multi-bit halftoning. LUTs might also be used to store pulse justification information (e.g., left, right or center). Justification information for a PQE PWM 267 might also be derived from the current data.

The LUTs 265 provide corrected information for the exposure levels for each PQE or multi-bit feature so as to provide the correct printed results. The PQE PWM 267 values for example may be adjusted to decrease the exposure for the purposes of eroding the printed results. The multi-bit halftone PWM values on the other hand must provide linearly and monotonically-changing printed results to implement the increased number of gray levels that are achieved using multi-bit halftone technology.

In one embodiment, equations are used to define the values stored in each LUT that correspond to an identified feature. One variable that is input into the equations is a vector having multiple elements. The elements of the vector are values that define the PWM exposure that would occur in an ideal situation. The number of elements of the vector matches the number of features stored in the LUTs. Each element of the vector are input into the equations and transformed into something that uniquely adapts the LUT values to the specific printer 230, based on already-known knowledge of that particular printer 230. Multiple vectors may be defined to allow the printer to function properly for different environments and different types of data. Embodiments of the invention implement the integrated PQE/multi-bit halftone such that PQE has been applied to the text/line art data by the PQE card 260, and the "pass-through" multi-bit halftone data are provided through the PW modulator 267 to the print head 270 for printing.

In some embodiments, a dual pixel element (dual PEL) technique may be applied to the input print data. Dual PEL is a technique that allows pixels to be combined to produce the same effective exposure as provided as if each PEL is handled individually. This reduces the PW modulation speed required on high-speed and high-dpi printers, such as digital printing presses. More specifically, dual PEL takes two individual pixels, combines them so as to provide the same exposure as would be achieved by single PELs, and through intelligent justification and PWM, makes the printed pixel appear the same as two adjacent single pixels. For purposes of embodiments of the invention if the dual PEL technique is used, it should be assumed that if one multi-bit halftone target PEL and one multi-bit text/line art PQE target PEL are encountered in the combining done by PQE card 260, then the combination should be assumed to be PQE data.

Figure 3:
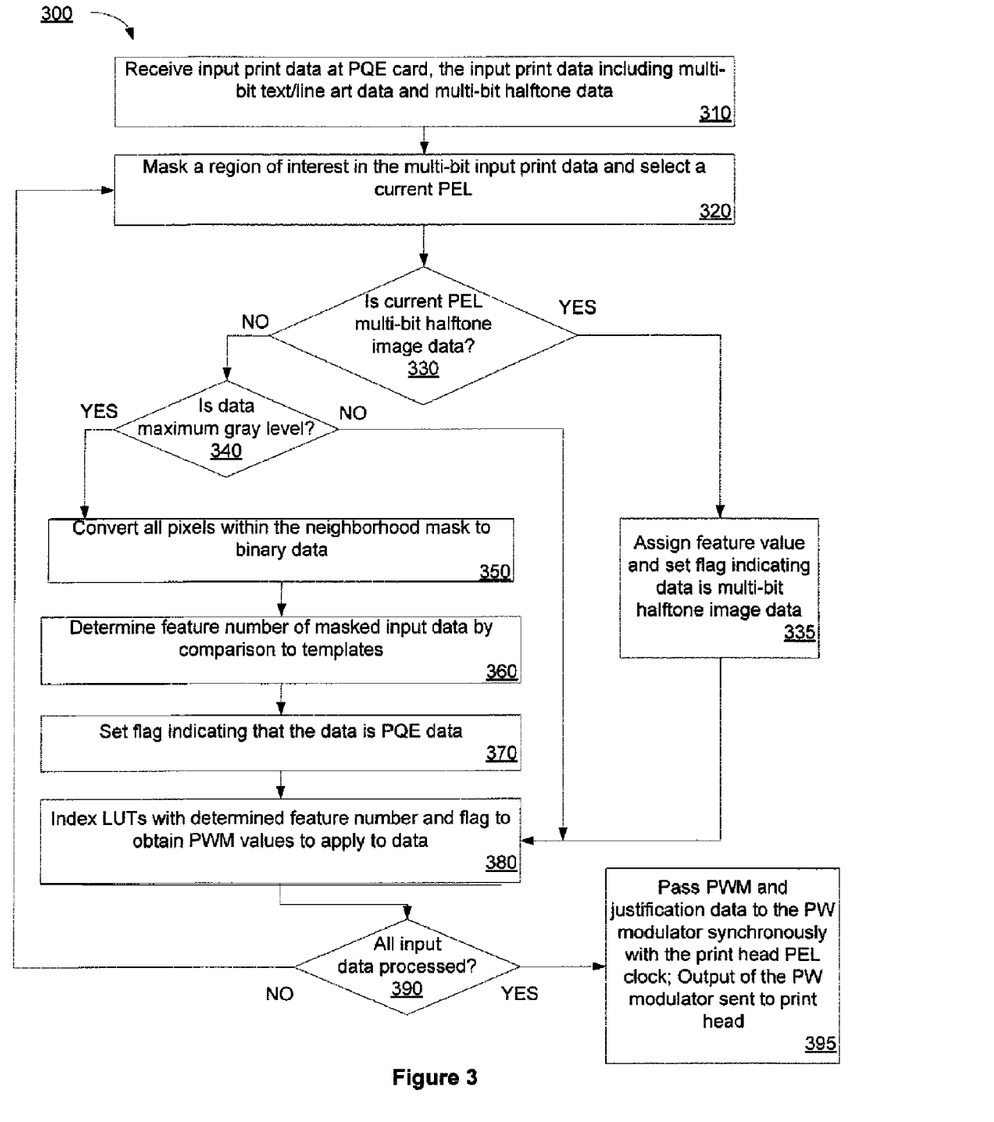
FIG. 3 is a flow diagram illustrating one embodiment of a process for integrating PQE and multi-bit halftone data.

FIG. 3 is flow diagram illustrating one embodiment of a process 300 for integrating PQE and multi-bit halftone data is disclosed. Process 300 may be performed by processing logic that may comprise hardware (e.g., circuitry, dedicated logic, programmable logic, microcode, etc.), software (such as instructions run on a processing device), or a combination thereof. In one embodiment, process 300 is performed by printer 230 described with respect to FIG. 2.

Process 300 intelligently separates combined multi-bit input data into (1) binary data that should be processed using PQE and (2) multi-bit halftone image data. At processing block 310, multi-bit input print data is received at a PQE card of the printer. The multi-bit input print data includes both multi-bit text/line art and multi-bit halftone image data. At decision block 320, a pixel of interest (e.g., current PEL) is identified by masking the multi-bit input print data and selected a current pixel that is in the center of this region of interest.

Then, at decision block 330, it is determined whether this current PEL is multi-bit data. This decision is based on the data within the masked region of interest. If data is found within the region of interest that is any of all possible multi-bit gray levels, but not including the maximum gray level (e.g., solid black) or the minimum gray level (e.g. white), then the current PEL is considered to be multi-bit halftone image data. If the current PEL is determined to be multi-bit halftone image data, then it is assigned a feature value equal to the multi-bit halftone image data for the current PEL and a flag is set indicating this PEL is multi-bit halftone image data at block 340.

On the other hand, if it is determined that the current PEL is not multi-bit halftone image data, then the process 300 continues to decision block 340 to determine whether the data is equal to the maximum gray level (e.g., solid black), which indicates high likelihood that this data is text or line art. The pixels that are not equal to the maximum gray level (e.g., black), will be minimum gray level (e.g., white) pixels and will not require any further processing by the PQE card. For these minimum gray level current PELs, a flag is set indicating that these are multi-bit data. This assignment is arbitrary since they also could be considered PQE. The only requirement is that ultimate no exposure is used when printing these PELs.

The current pixels that are equal to the maximum gray level (e.g., black) are the PELs that will be processed by PQE card. When the current PEL is identified to be processed by the PQE card, at block 350, all pixels within the neighborhood mask are converted to binary data. In one embodiment, a threshold operation may be used to convert the data to binary. Then, at block 360, a feature number is determined from the masked input data (which is now binary) via a comparison to binary templates stored in the PQE card. In addition, a flag is set for the current pixel that this data is PQE data at block 370.

At block 380, the determined feature number and flag are then used to index the respective LUTs in order to obtain exposure, justification or other values that are stored in the LUTs. Separate LUTs are provided for PQE data and multibit data. Multiple sets of LUTs might also be used. For instance, the values obtained from the LUTs may be used to modify the current pixel data to obtain PW modulation exposure information and justification to provide a better end-result printed presentation of the current PEL, which for the case of PELs that have been processed by PQE includes consideration of the neighboring data within the masked region of interest. In embodiments of the invention, the data from the LUTs may be stored or buffered. In some embodiments, justification might also be determined logically from the adjacent data.

At decision block 390, it is determined whether all of the input data has been processed. If not, then the process returns to decision block 320 to select a new pixel of interest for processing. If all input data has been processed, then the processing stops and at block 395 the PWM and justification data is passed, synchronously with the Printhead PEL clock, to the PW modulator while it is delivered to the print head. The data is delivered for the corresponding PELs that are being written by the beam or beams from the print head. This all occurs in synchronization with the paper that is being printed.

The flowchart of process 300 provides an illustration of the processing of an embodiment of the invention. The system may be implemented using the basic steps outlined as a real-time process where data is processed at the speed that the print head writes data where the data is synchronized by beam detection signal(s) from the print head and PEL clock(s) indicating which PELs are being written.

Figure 4A:
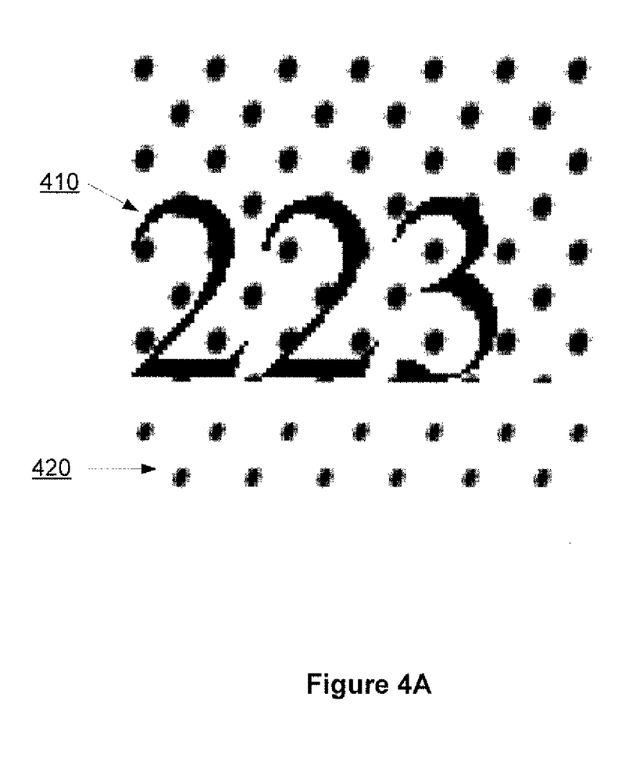
FIGS. 4A-4C are depictions of simulation results for the integrations of PQE and multi-bit halftone data according to one embodiment of the invention.
Figure 4B:
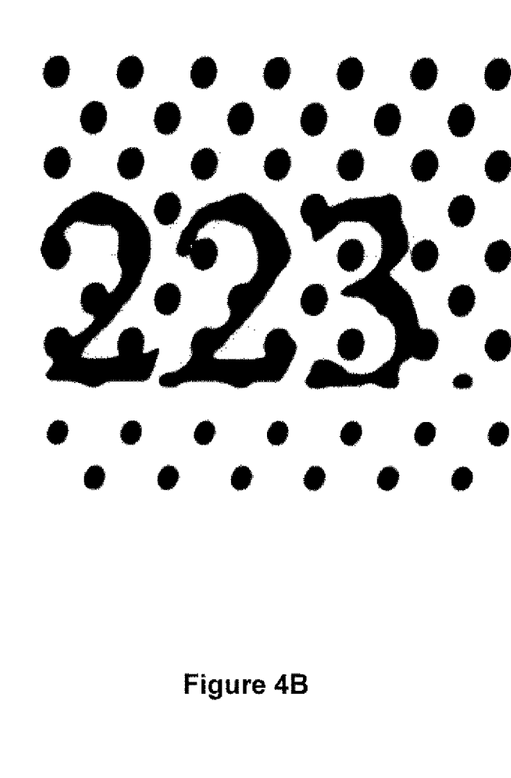
Figure 4C:
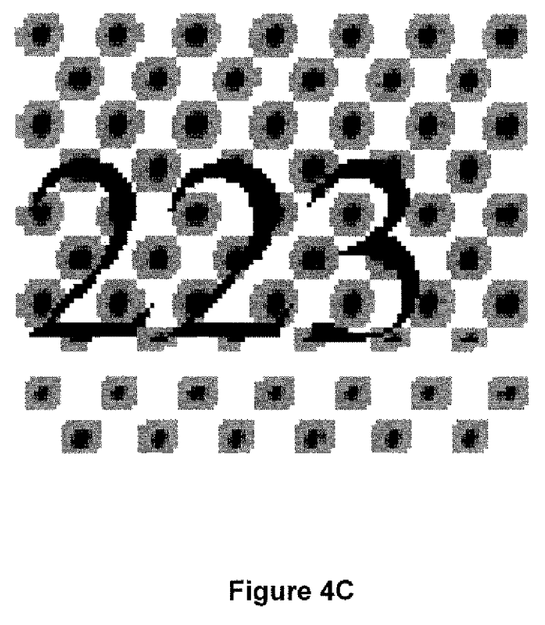

FIGS. 4A, 4B, and 4C are depictions of simulation results for the integrations of PQE and multi-bit halftone data according to one embodiment of the invention. FIG. 4A depicts a magnified view of an original image data before the integrated PQE and multi-bit halftone of embodiments of the invention are applied. The text '223' in the original image is the multi-bit text data 410, while the gray and black screen dots are the multi-bit halftone data 420. In embodiments of the invention, the multi-bit halftone data 420 will be preserved by passing through the PQE card, while the text data 410 has PQE technology applied to it.

FIG. 4B depicts a magnified view of the original image after the integrated PQE and multi-bit halftone of embodiments of the invention are applied to the image data, which simulates the printed results from an electro-photographic printer. The image of FIG. 4B shows how smaller screen dots are formed for the lower portion of the image, and larger screen dots are created for the upper portion in this simulated and magnified view. The text appears smooth and does not exhibit the jagged nature of the original text within the image. FIG. 4C illustrates the PELs in a 5×5 neighborhood region, using a gray overlay, that are considered to be multi-bit halftone image based on the combined multi-bit data.

Figure 5:
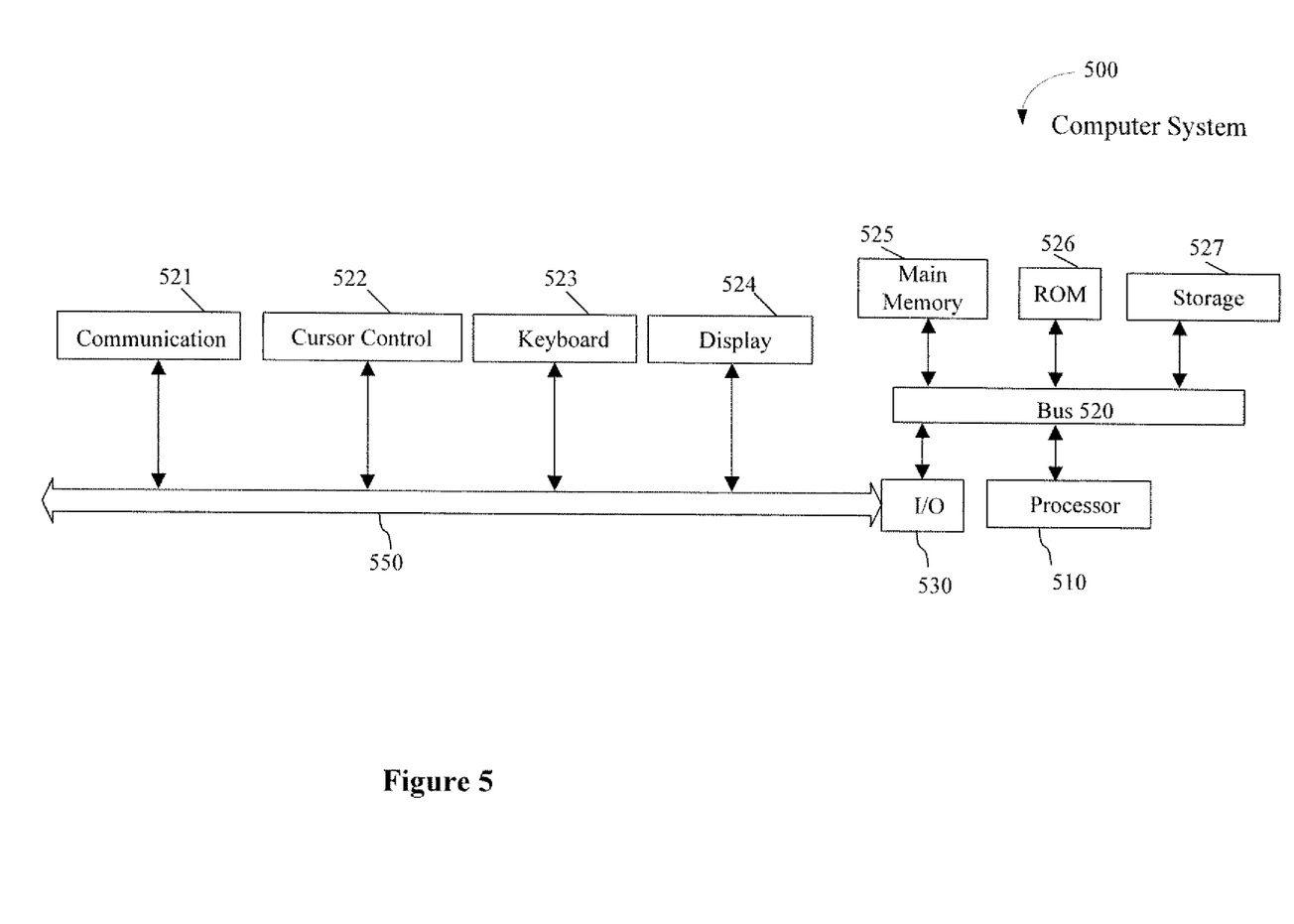
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A system, comprising:
   a print control unit communicably coupled to a printer, the print control unit operable to process received multi-bit input print data for printing by the printer;
   a print quality enhancement (PQE) card communicably coupled with the printer, the PQE card to:
      separate multi-bit text and line art input data from multi-bit halftone image input data in the multi-bit input print data;
      ignore any of the identified multi-bit halftone image input data for purposes of applying PQE technology to the identified multi-bit halftone image input data; and
      apply the PQE technology to the identified multi-bit text and line art input data; and
   a print head communicably coupled to the printer, the print head operable to print multi-bit output created by the PQE card.

2. The system of claim 1, wherein the PQE card operable to apply the PQE technology to the identified multi-bit text and line art input data further comprises the PQE card to, for each area of the identified text and line art input data:
   apply a neighborhood mask to an area of the multi-bit input data, wherein a pixel in the center of the neighborhood mask is a current pixel of interest;
   determine a feature value for the current pixel of interest by comparison to one or more templates and assigning a gray level as the feature value for multi-bit halftone data; and index one or more look-up tables (LUTs) with a feature number and feature type associated with the determined feature value to obtain at least one of PQE or multi-bit halftone modification values for the current pixel of interest.

3. The system of claim 2, wherein the one or more templates and the one or more LUTs are stored in the PQE card.

4. The system of claim 2, wherein the at least one of PQE or multi-bit halftone modification values alter a pulse width modulation, an exposure level, or a justification of the current pixel of interest.

5. The system of claim 2, wherein the neighborhood mask is a 5 pixel by 5 pixel neighborhood mask.

6. The system of claim 2, wherein the current pixel of interest comprises two adjacent pixels in the center of the neighborhood mask of the multi-bit input data, and wherein a combined feature is determined and pulse width modulation (PWM) values and justification values are created in order to produce a same result as if the current pixel of interest is a single pixel.

7. The system of claim 1, wherein the feature of the area of binary input data includes at least one of an edge, an isolated pixel, isolated lines, or a diagonal line.

8. The system of claim 1, wherein the PQE card operable to separate the multi-bit input data into the text and line art and multi-bit halftone image data by performing a windowing technique on the multi-bit input data.

9. A method for providing computer services comprising:
receiving multi-bit input print data for printing by a control unit of a printer;
separating, by a print quality enhancement (PQE) card of the printer, multi-bit text and line art input data from multi-bit halftone input data;
ignoring, by the PQE card, any identified multi-bit halftone input data for purposes of applying PQE technology to the identified multi-bit input data;
applying, by the PQE card, the PQE technology to identified multi-bit text and line art input data; and
printing, by a print head of the printer, multi-bit output data created by the PQE card, the multi-bit output data including the multi-bit text and line art data that has been modified by the PQE technology.

10. The method of claim 9, further comprising:
applying a neighborhood mask to an area of the multi-bit input data to identify a current pixel of interest (PEL) that is at a center of the neighborhood mask;
determining a feature type of the current PEL by comparison to one or more templates only for cases that there is no multi-bit data in pixels of the neighborhood mask consisting of the gray levels between a minimum and maximum gray level;
indexing one or more look-up tables (LUTs) with a feature number associated with the determined feature type to obtain modification values for the current PEL; and
applying the modification values to the current PEL.

11. The method of claim 10, wherein the one or more templates and the one or more LUTs are stored in the PQE card.

12. The method of claim 10, wherein the PQE modification values alter at least one of a pulse width modulation, an exposure level, and a justification of the current PEL.

13. The method of claim 10, wherein the neighborhood mask is a 5 pixel by 5 pixel neighborhood mask.

14. The method of claim 10, wherein the current PEL comprises two adjacent pixels in the center of the neighborhood mask of the multi-bit input data, and wherein a combined feature is determined and pulse width modulation (PWM) values and justification values are created in order to produce a same result as if the current pixel of interest is a single pixel.

15. The method of claim 9, wherein the PQE card operable to separate the multi-bit text and line art input data from the multi-bit input data further comprises the PQE card operable to perform a windowing technique on the multi-bit input data.

16. A computer program product of a non-transitory computer readable medium usable with a programmable computer, the computer program product having computer-readable code embodied therein for providing computer services, the computer-readable code comprising instructions for:
receiving multi-bit input print data for printing by a control unit of a printer;
separating, by a print quality enhancement (PQE) card of the printer, multi-bit text and line art input data from multi-bit halftone input data;
ignoring, by the PQE card, any identified multi-bit halftone input data for purposes of applying PQE technology to the identified multi-bit input data;
applying, by the PQE card, the PQE technology to identified multi-bit text and line art input data; and
printing, by a print head of the printer, multi-bit output data created by the PQE card, the multi-bit output data including the multi-bit text and line art data that has been modified by the PQE technology.

17. The computer program product of claim 16, the computer-readable code comprising further instructions for:
applying a neighborhood mask to an area of the multi-bit input data to identify a current pixel of interest (PEL) that is at a center of the neighborhood mask;
determining a feature type of the current PEL by comparison to one or more templates only for cases that there is no multi-bit data in pixels of the neighborhood mask consisting of the gray levels between a minimum and maximum gray level;
indexing one or more look-up tables (LUTs) with a feature number associated with the determined feature type to obtain modification values for the current PEL; and
applying the modification values to the current PEL.

18. The computer program product of claim 17, wherein the PQE modification values alter at least one of the pulse width modulation, the exposure level, and the justification of the area of binary input data.

19. The computer program product of claim 17, wherein the current PEL comprises two adjacent pixels in the center of the neighborhood mask of the multi-bit input data, and wherein a combined feature is determined and pulse width modulation (PWM) values and justification values are created in order to produce a same result as if the current pixel of interest is a single pixel.

20. The computer program product of claim 16, wherein the PQE card operable to separate the multi-bit text and line art input data from the multi-bit input data further comprises the PQE card operable perform a windowing technique on the multi-bit input data.

* * * * *